United States Patent
Ferrell

(10) Patent No.: US 7,533,921 B2
(45) Date of Patent: May 19, 2009

(54) MULTIFUNCTIONAL EXTENDABLE TAILGATE

(76) Inventor: Richard Ferrell, P.O. Box 837, Jefferson, OR (US) 97352

( * ) Notice: Subject to any disclaimer, the term of this patent is extended or adjusted under 35 U.S.C. 154(b) by 10 days.

(21) Appl. No.: 11/881,572

(22) Filed: Jul. 27, 2007

(65) Prior Publication Data
US 2009/0026789 A1    Jan. 29, 2009

(51) Int. Cl.
B62D 25/00    (2006.01)
(52) U.S. Cl. .......................................... 296/57.1; 296/3
(58) Field of Classification Search ................ 296/57.1, 296/26.08, 26.09, 50, 3, 26.05
See application file for complete search history.

(56) References Cited

U.S. PATENT DOCUMENTS

| | | | | |
|---|---|---|---|---|
| 4,138,046 A * | 2/1979 | De Freze | ..................... | 224/405 |
| 5,002,324 A * | 3/1991 | Griffin | ........................... | 296/3 |
| 5,037,152 A * | 8/1991 | Hendricks | ....................... | 296/3 |
| 5,143,415 A * | 9/1992 | Boudah | ........................... | 296/3 |
| 5,439,152 A * | 8/1995 | Campbell | ..................... | 224/405 |
| 5,494,327 A * | 2/1996 | Derecktor | ..................... | 296/3 |
| 5,628,540 A * | 5/1997 | James | ............................ | 296/3 |
| 5,941,588 A * | 8/1999 | Marconi | ..................... | 296/26.11 |
| 6,364,392 B1 * | 4/2002 | Meinke | ....................... | 296/57.1 |
| 6,698,810 B1 * | 3/2004 | Lane | .......................... | 296/57.1 |
| 6,983,968 B2 * | 1/2006 | Brauer et al. | ................... | 296/3 |
| 6,983,972 B2 * | 1/2006 | Tan et al. | ..................... | 296/57.1 |
| 6,988,756 B1 * | 1/2006 | Meinke et al. | ................. | 296/50 |
| 6,991,277 B1 * | 1/2006 | Esler | ........................... | 296/50 |
| 7,234,749 B1 * | 6/2007 | Firzlaff et al. | .............. | 296/57.1 |
| 7,267,387 B1 * | 9/2007 | Bruford et al. | ............. | 296/57.1 |
| 7,347,473 B2 * | 3/2008 | Miller et al. | ............... | 296/26.1 |
| 2004/0227368 A1 * | 11/2004 | Seksaria et al. | ............ | 296/57.1 |
| 2006/0208519 A1 * | 9/2006 | King | ......................... | 296/57.1 |

* cited by examiner

*Primary Examiner*—Kiran B. Patel

(57) ABSTRACT

An improved extendable tailgate for a vehicle with a cargo bed has an upright position and a horizontal position. With the tailgate in the upright position there is a hinged lower edge and an upper edge. The tailgate has a tailgate frame that has a substantially rectangular shape, a width and a height similar to a factory supplied tailgate. There is at least one hollow vertical member extending from the lower edge to the upper edge of the tailgate frame, and an extendable portion approximately the width and the height of the tailgate frame that has at least one vertical member that telescopes from within the hollow vertical member between a retracted position and an extended position. With the extendable tailgate in the extended position, the extendable portion essentially doubles the height of the tailgate.

12 Claims, 2 Drawing Sheets

MULTIFUNCTIONAL EXTENDABLE TAILGATE

BACKGROUND OF THE INVENTION

1. Field of the Invention

This invention relates to a tailgate assembly for a motor vehicle such as a pickup and more particularly to a tailgate assembly that has multiple functions.

2. Prior Art

Load carrying vehicles, such as trucks or pickups, often have fold down tailgates. While in the down position, the tailgate extends the area of the pickup bed thereby increasing the horizontal support surface for cargo within the truck bed. In the closed or up position, the tailgate keeps the cargo within the truck bed. The closed tailgate avoids loss of goods as well as minimizes the potential for loose items within the truck bed to fall into or onto the traffic following the truck.

In some situations, it is desirable to have the tailgate solid and closed, where in other situations it is more convenient to have the tailgate a more open structure for tying a load or allowing a portion of the load to protrude from the tailgate while not allowing the smaller items in the load to slide out. The ability to easily switch between a factory tailgate and a more multifunctional tailgate would allow further utility to a pickup.

There have been several attempts to increase the functionality of truck tailgates. These tailgates are typically very complicated and are not easily exchanged with the factory provided tailgate.

One such tailgate is disclosed in U.S. Pat. No. 6,364,392 issued to Meinke on Apr. 2, 2002. Meinke discloses a tailgate assembly that includes an extender assembly including a bar positioned proximate an upper edge of the tailgate. The bar may be raised to a position above the upper edge of the tailgate by sliding the post assemblies upward with guide tubes provided in the tailgate. Meinke also disclosed a tailgate assembly in which the tailgate may be readily extended to provide supplemental load support and/or load restraint.

However, the Meinke tailgate is a complicated and expensive tailgate assembly with sophisticated mechanics that will only extend the bed length or the tailgate height a distance less than half the existing tailgate height.

Another multifunctional tailgate is disclosed in U.S. Pat. No. 6,698,810 issued to Lane on Mar. 2, 2004. Lane discloses an "eight-functions-in-one truck tailgate extender" with one or more telescoping assemblies connecting the load-carrying member to either the tailgate or to the truck body." Although multifunctional, this patent does not claim or disclose a replacement type tailgate, but an optional addition to an existing tailgate. Installation of this tailgate will permanently alter the structure of the original or factory provided tailgate and will likely require costly professional installation.

There are also several motorized tailgates that are extremely expensive to install due to the wiring and addition of motors and the associated mechanism. These tailgates typically can withstand only minimal load or weight, are heavy and cumbersome. These motorized tailgates are essentially nonfunctional when the motor expires, malfunctions, or binds.

There is a need for a more useful multifunctional tailgate that is simplistic in design, readily exchangeable with a factory provided tailgate, strong enough to support a wide range of either hanging or resting heavy loads, and cost effective to manufacture.

OBJECTS AND ADVANTAGES OF THE PRESENT INVENTION

One object of the present invention is to provide a pickup tailgate with increased functionality and usefulness. It is another object of the present invention to provide the increased tailgate functionality while maintaining a simple, strong, and economical tailgate.

It is yet another object of the present invention to provide a tailgate that is readily interchangeable with a factory provided tailgate requiring little effort on the part of the user thereby giving the user full benefit of both the factory and a multifunctional or special purpose tailgate.

It is a further object of the present invention to provide a tailgate constructed from materials that are inexpensive yet sufficiently strong to attach or suspend other devices such as bike racks, luggage racks, cargo boxes, or the like to the rear portion of a pickup.

SUMMARY OF THE INVENTION

The present invention discloses an improved extendable tailgate for a vehicle with a cargo bed has an upright position and a horizontal position. With the tailgate in the upright position there is a hinged lower edge and an upper edge. The tailgate has a tailgate frame that has a substantially rectangular shape, a width and a height similar to a factory supplied tailgate. There is at least one hollow vertical member extending from the lower edge to the upper edge of the tailgate frame, and an extendable portion approximately the width and the height of the tailgate frame that has at least one vertical member that telescopes from within the hollow vertical member between a retracted position and an extended position. With the extendable tailgate in the extended position, the extendable portion essentially doubles the height of the tailgate.

The tailgate of the present invention is readily interchangeable with the factory provided tailgate.

BRIEF DESCRIPTION OF THE DRAWINGS

The above description and other objects, advantages, and features of the present invention will be more fully understood and appreciated by reference to the specification and accompanying drawings, wherein.

DRAWINGS—Reference Numerals

| | |
|---|---|
| 100 | Tailgate Assembly |
| 101 | Extendable Portion |
| 102 | Horizontal Extension Support |
| 104 | Vertical Lateral Supports |
| 106 | Inner Portion |
| 108 | Latching Mechanism |
| 110 | Vertical Cargo Supports |
| 112 | Latch Linkage Housing |
| 114 | Vertical Guide |
| 116 | Vertical Stabilizer |
| 117 | Latch Cover |
| 118 | Cargo Stop |
| 120 | Pickup Bed |
| 122 | Bumper |
| 130 | Pickup |
| 202 | Overhead Rack Front Bracket |
| 204 | Cargo |
| 402 | Cable |

DETAILED DISCUSSION OF THE PREFERRED EMBODIMENT

Referring to the figures, like elements retain their indicators throughout the several views.

Figure 1:
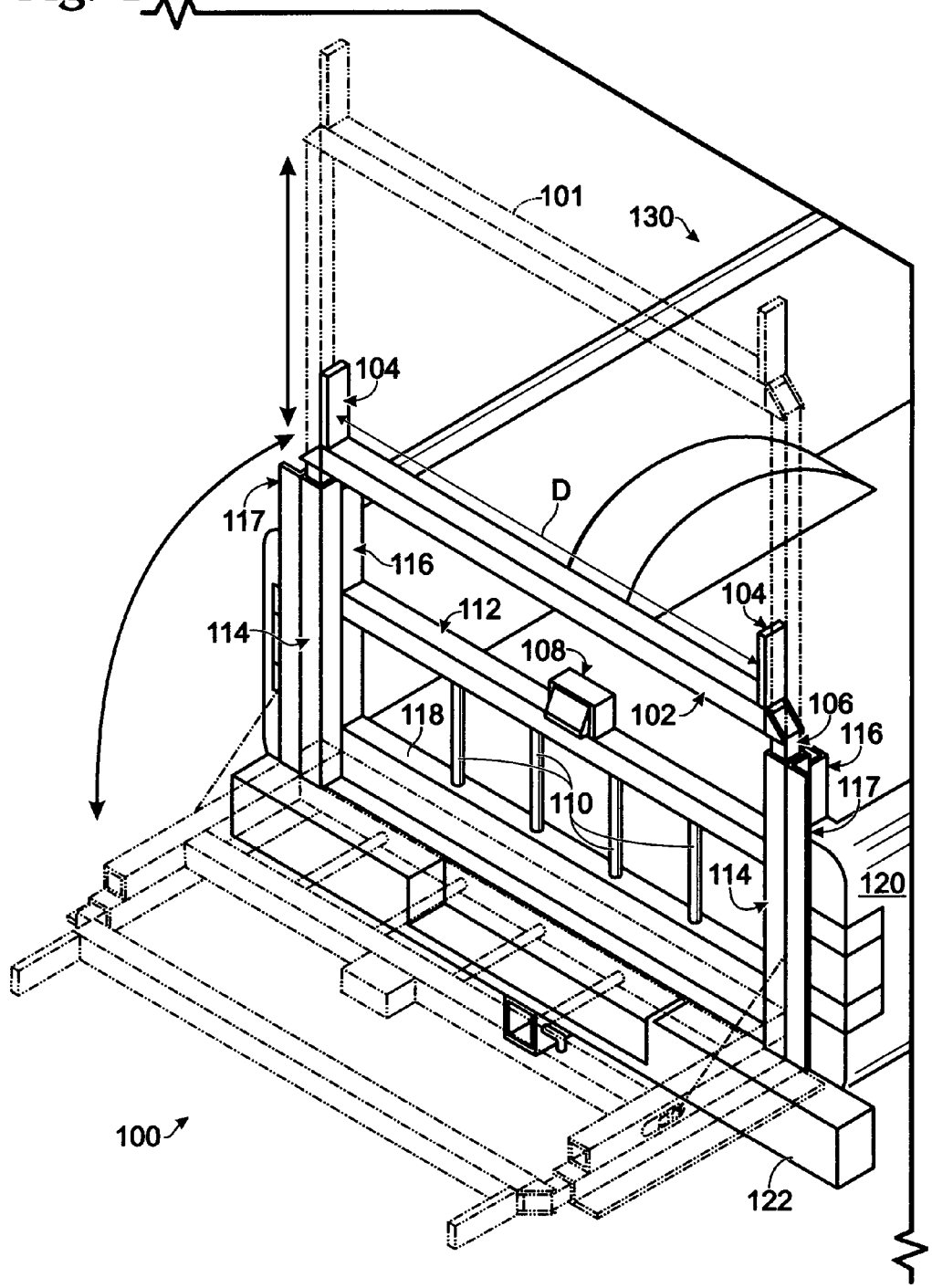
FIG. 1 depicts the rear portion of a truck where the tailgate is in the closed or up position. The tailgate in the open or down position is shown in phantom. The extendable portion of the tailgate is shown in the retracted position with the extended position shown in phantom.

FIG. 1 depicts the rear portion of Pickup 130 with Tailgate Assembly 100 in the closed or up position. Tailgate Assembly 100 in the open or down position is shown in phantom. The Extendable Portion 101 of Tailgate Assembly 100 is shown in the retracted position with Extendable Portion 101 in the extended position shown in phantom.

In the preferred embodiment, Tailgate Assembly 100 is attached to Pickup 130 at the rear, lower edge of Pickup Bed 120 and above Bumper 122 in a manner essentially the same as a factory provided tailgate. In the preferred embodiment, the simplistic design of Tailgate Assembly 100 allows use of the existing hinging and latch receiving mechanisms that are designed and installed in Pickup Bed 120 by the original manufacturer.

Tailgate Assembly 100 has an open design with Vertical Cargo Supports 110 extending between Cargo Stop 118 at the base of Tailgate Assembly 100 and Latch Linkage Housing 112. The latch linkage (not shown) is housed horizontally within Linkage Housing 112 and is actuated by Latching Mechanism 108. The ends of the latch (not shown) protrude through Vertical Stabilizer 116 and into the inside rear portion of Pickup Bed 120 to maintain the closed position of Tailgate Assembly 100.

In the preferred embodiment, there are four Vertical Cargo Supports 110. However, there can be as few as one or as many as may be desired for any particular application. The primary function of Vertical Cargo Supports 110 is to keep large items from sliding out of the rear of Pickup Bed 120. Cargo Stop 118 is a vertical piece that spans approximately the width of the inside of Pickup Bed 120 and, in the preferred embodiment, rises above Pickup Bed 120 by about three inches. Cargo Stop 118 is used both for stabilization of the framework of Tailgate Assembly 100 as well as to stop smaller, narrower pieces from sliding out the rear of Pickup Bed 120.

In the preferred embodiment, Vertical Guides 114 are positioned on either side of Tailgate Assembly 100. They are hollow structures that allow Inner Portions 106 of Extendable Portion 101 to slide into when in the contracted position. Projecting from the top of Inner Portions 106 are Vertical Lateral Supports 104. The distance, D, as shown in FIG. 1 between Vertical Lateral Supports 104 is preferably approximately four feet—the width of a standard sheet of plywood or other building board. Horizontal Extension Support 102 spans the distance, D, between Vertical Lateral Supports 104 to add strength and stability to Extendable Portions 101. Vertical Lateral Supports 104 also eliminate the danger of the load, for example a smaller board, from sliding outside of the width of Pickup Bed 120.

In the preferred embodiment, Tailgate Assembly 100 is constructed of square, steel structural tubing with Extendable Portion 101 constructed of a square, steel structural tubing that is slightly smaller in diameter than Vertical Guides 114 allowing Inner Portion 106 to telescope from within Vertical Guide 114. In addition to having the benefit of being relatively inexpensive, structural tubing lends itself to a multitude of attachable, added features that can be used alone or in combination with other portions of Tailgate Assembly 100. Some examples being: bike racks, luggage racks, cargo boxes, or even signs with advertisements or announcements.

It has also been contemplated to construct Tailgate Assembly 100 of an aluminum square stock or any other shaped material of suitable strength to handle potentially heavy cargo.

Latch Covers 117 are adjacent to and affixed to Vertical Guide 114. Latch Covers 117 are used to cover Cables 402 (shown in FIG. 4) and the extended portion of the latching mechanism that protrudes from Latch Linkage Housing 112. Additionally, Latch Covers 117 assist in keeping Cables 402 (not shown) and the exposed portion of the latching mechanism clean and functioning properly. Latch Covers 117 also add strength and stability to Tailgate Assembly 100.

Figure 2:
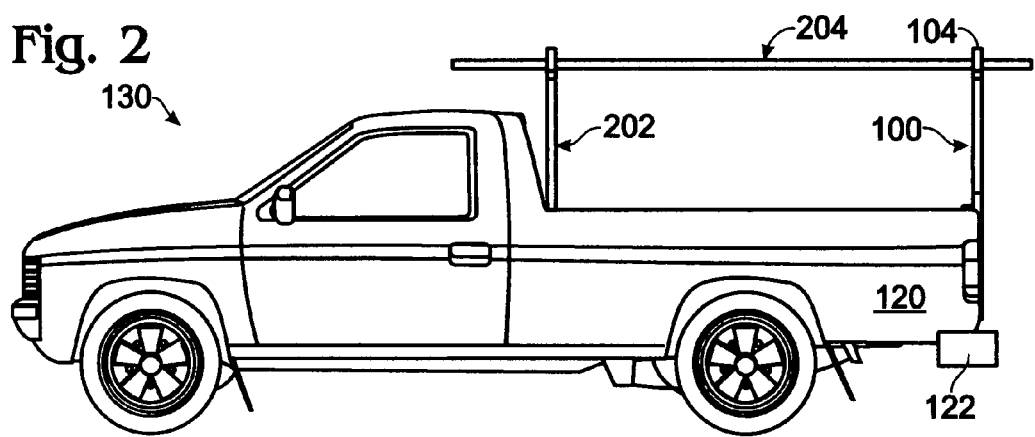
FIG. 2 is a side view of a pickup depicting the extendable feature of the present invention in the extended position with the tailgate in the closed or up position.

FIG. 2 is a side view of Pickup 130 depicting Extendable Portion 101 of Tailgate Assembly 100 of the present invention in the extended position with Tailgate Assembly 100 in the closed or up position.

In FIG. 2, Overhead Rack Front Bracket 202 is shown behind the cab of Pickup 130 and near the front of Pickup Bed 120. When extended, Overhead Rack Front Bracket 202 is essentially the same height as Extendable Portion 101. This allows Extendable Portion 101 to function as the mating pair to Overhead Rack Front Bracket 202. This type of overhead racking system is very common with contractors or handymen who haul loads, such as Cargo 204, that are longer than their pickup beds while leaving the bed itself available for other cargo or supplies.

Often pickups have optional overhead racking systems that are one piece that extends above the cab and encompasses the perimeter of the bed of the pickup. These systems are large and heavy therefore require a minimum of two men to remove or install them. The overhead rack of the present invention is removed by simply lowering Extendable Portion 101 and removing the front rack behind the cab—many applications allow the front rack to stay in place. Removing the overhead rack of the present invention is quickly and effortlessly performed by one person.

Figure 3:
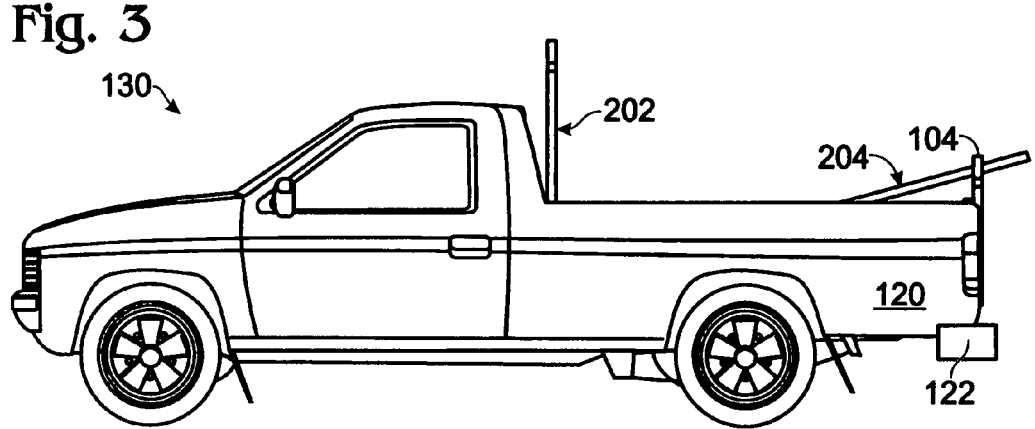
FIG. 3 is a side view of a pickup depicting the extendable feature of the present invention in the retracted position with the tailgate in the closed or up position.

FIG. 3 is a side view of Pickup 130 depicting Extendable Portion 101 of Tailgate Assembly 100 of the present invention in the retracted position with Tailgate Assembly 100 in the closed or up position. This is a useful alternative to a regular tailgate as Cargo 204 can be longer than Pickup Bed 120 and can protrude safely beyond Tailgate Assembly 100. In this embodiment, Lateral Supports 104 can be used to either tie the load in or function as a lateral stop to avoid side to side sliding. Simply propping a long load against the top of a factory tailgate can be a problem if the load slips too far over the side of Pickup Bed 120 and into the adjacent traffic.

Figure 4:
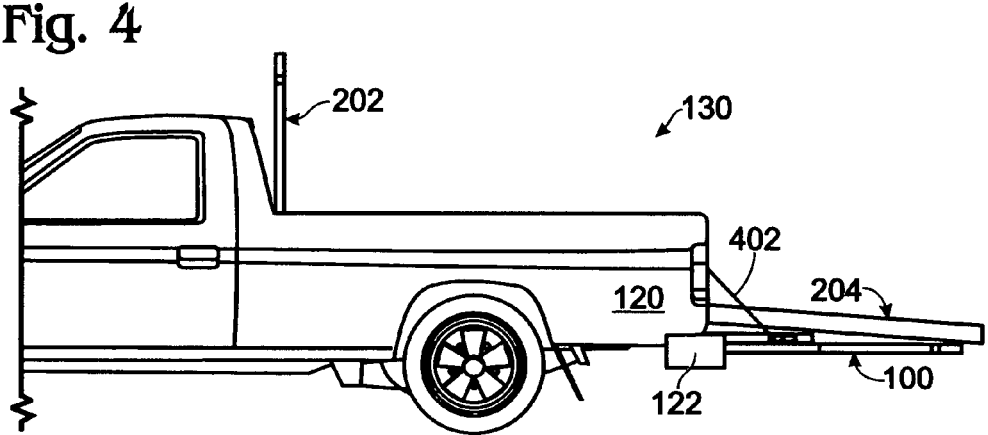
FIG. 4 is a side view of a portion of a pickup depicting the extendable feature of the present invention extended with the tailgate in the open or down position.

FIG. 4 is a side view of a portion of Pickup 130 depicting Extendable Portion 101 of the present invention extended with Tailgate Assembly 100 in the open or down position. In this configuration, the length of the potential load in Pickup Bed 120 is approximately an additional two feet longer than a factory provided tailgate in the down position. Cable 402 (discussed previously) is connected to both sides of the rear of Pickup Bed 120 to support Tailgate Assembly 101 in the down or open position. Cable 402 is a common feature of factory tailgates and is easily connectable to Tailgate Assembly 101 of the present invention.

Wherein the terms and expressions which have been employed in the foregoing specification are used therein as terms of description and not of limitation, there is no intention, in the use of such terms and expressions, of excluding equivalents of the features shown and described or portions thereof, it being recognized that the scope of the invention is defined and limited only by the claims which follow.

I claim:

1. An improved extendable tailgate assembly for a pickup having a pickup bed, the tailgate assembly having a hinged lower edge whereby the tailgate assembly hingeably moves between an upright position and a horizontal position, the tailgate assembly having a substantially rectangular shape, and a width and a height approximate a factory supplied pickup tailgate, the tailgate assembly comprising:
   at least two hollow vertical guides extending from the hinged lower edge to an upper edge opposite the hinged lower edge and spaced apart approximately the width of the tailgate assembly;
   a horizontal extension support approximately the width of the tailgate assembly having at least two vertical inner portion fixedly attached to opposing end of the horizontal extension support that telescope from within the at least two hollow vertical guides between a retracted position and an extended position;
   at least two vertical lateral supports fixedly attached to and extending approximately five inches above the upper edge of the extension support;
   a latch linkage housing spanning the width of the tailgate assembly; and
   a latching mechanism contained within the latch linkage housing and spanning the width of the tailgate assembly;
   wherein, in the extended position the horizontal extension support and the two vertical inner portions essentially double the height of the tailgate assembly, and when the tailgate assembly is latched in the close position, the latching mechanism has at least two latch portions that extend from the width of the tailgate assembly and are disposed in at least two recesses in the pickup bed.

2. The improved extendable tailgate assembly of claim 1, wherein the tailgate assembly is made of square steel tubing.

3. The improved extendable tailgate assembly of claim 1, wherein the tailgate assembly is made of square aluminum tubing.

4. The improved extendable tailgate assembly of claim 1, wherein the tailgate assembly is made of round steel tubing.

5. The improved extendable tailgate assembly of claim 1, wherein the tailgate assembly is made of round aluminum tubing.

6. The improved extendable tailgate assembly of claim 1, wherein the pickup bed having an overhead rack front bracket located adjacent to a passenger cab of the pickup and rising above the passenger cab wherein the horizontal extension support is parallel to and a similar height as the overhead rack front bracket when in the extended position.

7. The improved extendable tailgate assembly of claim 1, further comprising a detachable bike rack attached to the tailgate assembly.

8. The improved extendable tailgate assembly of claim 1, further comprising a detachable luggage rack attached to the tailgate assembly.

9. The improved extendable tailgate assembly of claim 1, further comprising at least one detachable sign bracket attached to the tailgate assembly, wherein an advertising sign can be affixed to the detachable sign bracket on the tailgate assembly.

10. The improved extendable tailgate assembly of claim 1, further comprising at least one detachable sign bracket attached to the tailgate assembly and at least one second detachable sign bracket attached to the extendable portion wherein with the extendable portion in the extended position a large advertising sign can be affixed to the detachable sign bracket on the tailgate assembly and the second detachable sign bracket on the horizontal extension support.

11. The improved extendable tailgate assembly of claim 1, further comprising a detachable cargo box attached to the tailgate assembly.

12. The improved extendable tailgate of claim 1, wherein said tailgate assembly is interchangeable with the factory supplied tailgate.

* * * * *